Patented Jan. 13, 1942

2,270,215

UNITED STATES PATENT OFFICE 2,270,215

PREPARATION OF N-ALKYL AMINO-PHENOLS

Howard M. Fitch, Wilmington, Del., assignor to E. I. du Pont de Nemours & Company, Wilmington, Del., a corporation of Delaware No Drawing. Application December 15, 1938, Serial No. 245,911

22 Claims. (Cl. 260—574)

This invention relates to methods for preparing certain N-alkylidene aminophenols and N-monoalkyl aminophenols and to new N-alkylidene aminophenols.

Many attempts have been made to produce N-alkylidene aminophenols by condensing normal aliphatic aldehydes, such as acetaldehyde and n-butyl aldehyde, with primary amino-phenols. These processes have not proved to be commercially successful for the reason that the reaction products are usually amorphous or tarry products of indefinite constitution which behave as polymerization products and show few, if any, of the properties of N-alkylidene aminophenols. They apparently consist primarily of polymerized condensation products rather than the simple alkylidene aminophenols. They do not reduce cleanly to N-alkyl aminophenols. Any alkylidene aminophenol, as thus produced, is quite unstable and readily polymerizes or hydrolyzes rapidly, rendering it extremely difficult, if not impossible, to isolate the alkylidene aminophenol. Accordingly, it has not been practicable to prepare N-alkyl aminophenols by condensing an aliphatic aldehyde with an aminophenol and then reducing to the N-alkyl aminophenols.

R. G. Clarkson in his application for "Aminophenols and their preparation," filed October 29, 1938, Serial No. 237,749, patented November 5, 1940, as Patent No. 2,220,065, discloses and claims new N-(alpha-isoalkylidene)-aminophenols and N-(alpha-isoalkyl)-aminophenols and methods for producing such N-(alpha-isoalkylidene)-aminophenols. By the term N-(alpha-isoalkylidene)-aminophenol is meant an N-alkylidene aminophenol in which at least two alkyl groups are attached to the carbon atom next to the

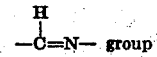

group and which has the formula

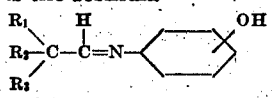

wherein $R_1$ and $R_2$ represent alkyl radicals and $R_3$ represents hydrogen or an alkyl group. They may be prepared from a-isoalkyl aldehydes, which are aliphatic aldehydes in which at least two alkyl groups are attached to the carbon atom next to the CHO group and which aldehydes may be represented by the formula

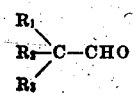

wherein $R_1$ and $R_2$ represent alkyl groups and $R_3$ represents hydrogen or an alkyl group. My invention is directed to improvements in the invention claimed by Clarkson in such application, and I do not claim any of the inventions claimed by Clarkson in such application, but merely claim improvements over the inventions claimed by Clarkson.

It is an object of my invention to provide a method whereby N-alkyl aminophenols may be produced in high yields and in a relatively pure state from aminophenols and aliphatic aldehydes, including the normal, branched chain, and unsaturated aliphatic aldehydes. Another object of my invention is to provide a new and improved method of hydrogenating alkylidene aminophenols. A further object is to provide a new class of N-alkylidene aminophenols which are more stable than alkylidene aminophenols which have been known heretofore. A still further object is to provide a method for producing new and more stable N-alkylidene aminophenols and for producing N-alkyl aminophenols therefrom. Other objects are to provide new compositions of matter and to advance the art. Still other objects will appear hereinafter.

Some of the objects of my invention may be accomplished by condensing 1 mole of an alkyl aldehyde with 1 mole of a primary aminophenol and simultaneously hydrogenating the alkylidene aminophenol by catalytic hydrogenation in the liquid phase. This may be accomplished by placing a solution or dispersion of the aminophenol, in a suitable liquid medium and in the presence of a hydrogenation catalyst and a hydrogen atmosphere, under hydrogenating conditions and then gradually adding the alkyl aldehyde thereto. By the gradual or stepwise addition of the aldehyde to the aminophenol under such hydrogenating conditions in the liquid phase, the aldehyde reacts promptly with the aminophenol to form the alkylidene aminophenol which is immediately reduced to the corresponding N-alkyl aminophenol, and neither the aldehyde nor the alkylidene aminophenol will polymerize to any substantial extent even when the easily polymerizable normal alkyl aldehydes are employed. Thus, it is possible to produce high yields of very pure N-alkyl aminophenols even from the normal alkyl aldehydes.

While it is preferred to condense the aldehyde with the aminophenol and simultaneously hydrogenate—and it is, in fact, essential to follow such procedure in order to obtain high yields when normal aldehydes are employed—I have found that it is possible to obtain satisfactory yields of N-alkyl aminophenols from the N-(alpha-isoalkylidene)-aminophenols, discovered by Clarkson and disclosed in his patent No. 2,220,065, hereinbefore referred to, by first isolating such alkylidene aminophenols and then hydrogenating. Thus, further objects of my invention may be accomplished.

Other objects of my invention may be accomplished by condensing an alpha-beta-alkenyl aldehyde with a primary aminophenol whereby an N-(alpha-beta-alkenylidene)-aminophenol is obtained. The alpha-beta-alkenyl aldehydes are those in which the alpha and beta carbon atoms are doubly bonded together and correspond to the formula

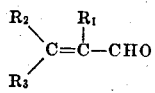

wherein $R_1$, $R_2$ and $R_3$ each represents hydrogen or an alkyl group. The N-(alpha-beta-alkenylidene)-aminophenols will then correspond to the formula

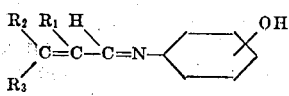

wherein $R_1$, $R_2$ and $R_3$ each represents hydrogen or an alkyl radical.

The resulting N-(alpha-beta-alkenylidene)-aminophenols are new chemical compounds, not known heretofore, and are more stable than other alkylidene aminophenols heretofore known. These new N-(alpha-beta-alkenylidene)-aminophenols are sufficiently stable so that they can be stored for long periods of time, even in the presence of the atmosphere and water vapor.

While it would be expected that the alkenyl aldehydes would polymerize more rapidly and to a greater extent than the normal saturated aldehydes and that the alkenylidene aminophenols would also polymerize more readily and to a greater extent than the saturated alkylidene aminophenols, I have found that the alkenyl aldehydes condense with the aminophenols with practically no polymerization of either the aldehyde or the resulting alkenylidene aminophenol.

Upon hydrogenation of the N-(alpha-beta-alkenylidene)-aminophenols in accordance with my invention, both the alpha-beta double bond and the —CH=N— linkage become saturated, and N-alkyl-aminophenols, in which the alkyl groups are saturated, are formed. Since these N-(alpha-beta-alkenylidene)-aminophenols are stable, it is not necessary to hydrogenate them to the N-alkyl aminophenols simultaneously with their formation, but they may be isolated and subsequently hydrogenated, and high yields of relatively pure N-alkyl aminophenols will still be obtained.

By the term "primary aminophenols," I mean aromatic compounds containing both a hydroxyl and a primary amino group attached to ring carbon atoms of the same aromatic nucleus, and include compounds in which the aromatic ring is of the benzene, naphthalene, anthracene or higher aromatic series. These aminophenols may contain, as substituents, alkyl, aryl, aralkyl, alkoxy, aralkoxy, aryloxy, halogen and additional hydroxyl and amino groups, but are preferably devoid of reducible substituents. Preferably, I employ aminophenols of the benzene series. I also prefer aminophenols in which the substituents are restricted to alkyl substituents, in other words, the unsubstituted and alkyl substituted aminophenols. Further, the ortho and para aminophenols appear to be the most useful.

By the term "unsubstituted aliphatic aldehydes," I intend to include both the saturated and unsaturated aldehydes which, except for the oxygen of the aldehyde group, consist of carbon and hydrogen. Further, the terms "unsubstituted aliphatic aldehydes" and "alkyl aldehydes" are to be construed to include only the strictly aliphatic aldehydes and to exclude aldehydes containing aromatic rings. The aldehydes may contain hydroxyl, halogen and alkoxy groups, but are preferably unsubstituted. Among the aldehydes which I have found to be particularly satisfactory in my process are:

n-Butyraldehyde
Propylaldehyde
n-Valeric aldehyde
Iso-valeric aldehyde
n-Hexyl aldehyde
n-Octyl aldehyde
Iso-butyraldehyde
2-methyl-butyraldehyde
2-trimethyl acetaldehyde
2-ethyl butyraldehyde
2-methyl pentanal
2-ethyl hexanal
2,4-dimethyl pentanal
Acrolein
Crotonaldehyde
1-methyl acrolein
1-ethyl-2-propyl acrolein
Alpha-beta hexenic aldehyde In carrying out the reaction, it is preferable to employ a slight excess of aldehyde and preferably from 1.1 to 1.2 moles are used for each mole of aminophenol. It will be found practical to use from about 1 to about 1.5 moles of aldehyde to each mole of aminophenol. By "a substantially equimolecular proportion" of an aldehyde, as hereinafter employed, I mean from about 1 to about 1.5 moles for each mole of aminophenol. Larger or smaller amounts of aldehyde may be used, but without substantial advantage. A lesser amount of aldehyde will necessarily leave unreacted aminophenol to be separated from the desired product. Larger amounts of aldehyde provide an unnecessary excess of aldehyde, most of which is reduced to the corresponding alcohol during the hydrogenation.

Further improvements in accordance with my invention result from the use, as solvents, particularly in the hydrogenation step, of polar solvents and aliphatic hydrocarbons. By the term "polar solvents," I mean solvents selected from the aliphatic alcohols, aliphatic esters, aliphatic ethers, aliphatic ketones, alcohol ethers, halogenated aliphatic hydrocarbons, water and mixtures of two or more thereof, and particularly mixtures of such polar solvents, other than water, with substantial amounts of water. A substantial amount of water will be at least 0.5%.

In the prior art, it has been stressed that the best results, in the catalytic hydrogenation of Schiff's bases of aminophenols, were obtained when non-polar solvents, such as aromatic hydrocarbon solvents, were employed. I have found that the best results, in reducing N-alkylidene aminophenols to the corresponding N-alkyl aminophenols, are generally produced by using polar solvents or aliphatic hydrocarbon solvents.

The solution or dispersion of the N-alkylidene aminophenol in such solvent may be obtained by preparing the alkylidene aminophenol in such solvent or a different solvent, followed by isolation of the alkylidene aminophenol and then dissolving or dispersing it in the desired solvent. Also, such solution may be obtained by forming the alkylidene aminophenol in the desired solvent, and the reaction mixture, as obtained or after removing one or more undesirable ingredients therefrom, may then be hydrogenated. Preferably, the alkylidene aminophenol is formed in the desired solvent under hydrogenating conditions, whereby it is hydrogenated as it is formed; that is, by simultaneous formation and hydrogenation of the alkylidene aminophenol in the polar solvent.

In order to illustrate my invention more clearly, the preferred modes of carrying the same into effect, and the advantageous results to be obtained thereby, the following examples are given, in which the parts are by weight, except where specifically indicated otherwise.

EXAMPLE 1.—N-crotonal-p-aminophenol 77 parts of crotonaldehyde was rapidly added with stirring to 109 parts of p-aminophenol suspended in 500 parts by volume of 50% alcohol at 33° C. The temperature of the reaction mixture increased to 47° C., the p-aminophenol dissolved, and a precipitate promptly formed. The reaction mixture was then cooled and filtered. The precipitate was washed with 100 parts by volume of 50% alcohol and then with 300 parts by volume of ether, after which it was dried at room temperature in a slow stream of air.

The product was 136 parts of N-crotonal-p-aminophenol as salmon-pink crystals, which melted at 140–142° C. with decomposition and contained 8.68% N. The theory for $C_{10}H_{11}ON$ is 8.69% N. The product has the formula

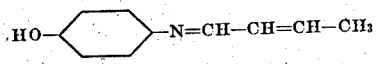

It may be stored in air at room temperature for long periods of time without appreciable alteration.

The identity of the product was confirmed by reduction to N-(n-butyl)-p-aminophenol. 100 parts of N-crotonal-p-aminophenol, prepared as described above, 20 parts of an active nickel-on-kieselguhr catalyst and 100 parts by volume of toluene were shaken at 125 to 135° C. under 400 to 500 lbs./sq. in. hydrogen pressure until no more hydrogen was absorbed. The charge was then cooled and filtered from catalyst and some insoluble material. The filtrate was freed of solvent by distillation under reduced pressure, and the residue was distilled in vacuo. The product was 34 parts of N-(n-butyl)-p-aminophenol as a yellow oil, B. P. 160–170° C. at 0.5 mm. pressure, containing 8.06% N. The theory for $C_{10}H_{15}ON$ is 8.48% N.

EXAMPLE 2.—N-(2-methyl butyl)-p-aminophenol 50 parts of N-(2-methyl butyral)-p-aminophenol, prepared by condensing 2-methyl butyraldehyde with p-aminophenol, 0.25 part of platinum oxide catalyst and 150 parts by volume of methanol were shaken in an atmosphere of hydrogen at room temperature until no more hydrogen was absorbed. Preferably, the catalyst is prepared according to the method of Adams, Vorhees and Shriner, Organic Synthesis, vol. XIII, page 92. The reduced reaction mixture was then filtered from the catalyst. The filtrate was freed of solvent by distillation, and the residue was distilled under reduced pressure. The distilled product was 43 parts of N-(2-methyl butyl)-p-aminophenol as a yellow oil, boiling point 155–165° C., at 0.5 mm. pressure.

This product was further purified through its neutral oxalate salt. The purified salt was obtained as white needles, melting point 186–187° C. with evolution of gas, containing 6.18% N. The theory for N-(2-methyl butyl)-p-aminophenol neutral oxalate $(C_{24}H_{36}O_6N_2)$ is 6.24% N. The base was obtained from this salt as pearl-grey plates, melting point 38° C., containing 8.05% N. The theory for N-(2-methyl butyl)-p-aminophenol $(C_{11}H_{17}ON)$ is 7.82% N.

EXAMPLE 3.—N-(isobutyl)-p-aminophenol 50 parts of N-(isobutyral)-p-aminophenol, prepared by condensing isobutyraldehyde with p-aminophenol, and 0.25 parts of platinum oxide catalyst in 100 parts by volume of 95% alcohol was reduced as described in Example 2. The product, after distillation under reduced pressure, was 42 parts of N-(isobutyl)-p-aminophenol as a yellow oil, B. P. 140–150° C./0.5 mm., which promptly crystallized and contained 8.64% N. The theory for N-(isobutyl)-p-aminophenol $(C_{10}H_{15}ON)$ is 8.48% N.

EXAMPLE 4.—N-(2-trimethyl ethyl)-p-aminophenol

N-(2-trimethyl acetal)-p-aminophenol was prepared by condensing trimethyl acetaldehyde with p-aminophenol. 34 parts of this N-(2-trimethyl acetal)-p-aminophenol with 0.25 part of platinum oxide catalyst in 150 parts by volume of methanol was reduced as described in Example 2. The product obtained, after removal of catalyst and solvent from the reduction mixture, was 33 parts of N-(2-trimethyl ethyl)-p-aminophenol. This product was purified through its neutral oxalate salt. The purified salt was obtained as white needles, melting point 208° C. with gas evolution, containing 6.38% N. The theory for N-(2-trimethyl ethyl)-p-aminophenol neutral oxalate $(C_{24}H_{36}O_6N_2)$ is 6.24% N. The base was obtained from this salt as light pink crystals, melting point 132° C., containing 7.75% N. The theory for N-(2-trimethyl ethyl)-p-aminophenol $(C_{11}H_{17}ON)$ is 7.82% N.

EXAMPLE 5.—N-(2-ethyl butyl)-p-aminophenol 50 parts of N-(2-ethyl butyral)-p-aminophenol, prepared by condensing 2-ethyl butyraldehyde with p-aminophenol, and 0.25 part of platinum oxide catalyst in 150 parts by volume of 95% alcohol was reduced as described in Example 2. The product, after distillation under reduced pressure, was 45 parts of N-(2-ethyl butyl)-p-aminophenol as a yellow oil, boiling point 175–180° C./0.5 mm., which promptly crystallized and contained 7.20% N. The theory for N-(2-ethyl butyl)-p-aminophenol $(C_{12}H_{19}ON)$ is 7.25% N. A sample of the product was purified through its neutral oxalate salt. The purified salt was obtained as light tan, long needles, melting point 196–197° C. with evolution of gas, containing 5.82% N. The theory for N-(2-ethyl butyl)-p-aminophenol neutral oxalate $(C_{26}H_{40}O_6N_2)$ is 5.88% N. N-(2-ethyl butyl)-p-aminophenol was obtained from this salt as light tan crystals, melting point 95° C.

EXAMPLE 6.—*N-(2-methyl pentyl)-p-aminophenol*

50 parts of N-(2-methyl pentanal)-p-aminophenol, prepared by condensing 2-methyl pentanal with p-aminophenol, with 0.25 part of platinum oxide catalyst in 150 parts by volume of methanol was reduced as described in Example 2. The product, after distillation under reduced pressure, was 43 parts of a yellow oil containing 7.39% N. The theory for N-(2-methyl pentyl)-p-aminophenol ($C_{12}H_{19}ON$) is 7.25% N. The product was purified through its neutral oxalate salt. The purified salt was obtained as white crystals, melting point 188° C. with evolution of gas, containing 5.76% N. The theory for N-(2-methyl pentyl)-p-aminophenol neutral oxalate ($C_{26}H_{40}O_6N_2$) is 5.88% N. N-(2-methyl pentyl)-p-aminophenol was obtained from this salt as a colorless oil, boiling point 145–149° C./0.5 mm., containing 7.16% N.

EXAMPLE 7.—*N-(2-ethyl hexyl)-p-aminophenol*

50 parts of N-(2-ethyl hexanal)-p-aminophenol, prepared by condensing 2-ethyl hexanal with p-aminophenol, and 0.30 part of platinum oxide catalyst in 150 parts by volume of methanol were reduced as described in Example 2. The product, after distillation under reduced pressure, was 47 parts of N-(2-ethyl hexyl)-p-aminophenol as a yellow oil containing 6.46% N. The theory for $C_{14}H_{23}ON$ is 6.33% N. The product was purified through its neutral oxalate salt. The salt was obtained as white crystals which melted at 181–182° C. and contained 5.04% N. The theory for N-(2-ethyl hexyl)-p-aminophenol neutral oxalate ($C_{30}H_{48}O_6N_2$) is 5.26% N. N-(2-ethyl hexyl)-p-aminophenol was obtained from this salt as a pale yellow oil, boiling point 158–162° C./0.5 mm., containing 6.28% N.

EXAMPLE 8.—*N-(2-ethyl butyl)-o-aminophenol*

50 parts of N-(2-ethyl butyral)-o-aminophenol, prepared by condensing 2-ethyl butyraldehyde with o-aminophenol, and 0.25 part of platinum oxide catalyst in 150 parts of methanol were reduced as described in Example 2. The product was 46 parts of N-(2-ethyl butyl)-o-aminophenol as a yellow oil, boiling point 145–150° C. at 0.5 mm. pressure, containing 7.07% N. The theory for $C_{12}H_{19}ON$ is 7.25% N.

EXAMPLE 9.—*N-(n-butyl)-p-aminophenol*

An autoclave was charged with 218 parts of p-aminophenol, 30 parts of an active nickel-on-kieselguhr catalyst and 1,000 parts by volume of toluene. The air was displaced by hydrogen, the mass heated to 130° C. and a pressure of 350 lbs./sq. in. of hydrogen applied. While the charge was agitated, 288 parts of freshly distilled n-butyraldehyde dissolved in 980 parts by volume of toluene was pumped into the autoclave in 21 approximately equal portions which were added at approximately 15-minute intervals. After each portion was added, absorption of hydrogen took place, and additional quantities of the gas were added to maintain the pressure at between 300 and 350 lbs./sq. in. The temperature was held at 120–130° C. during the entire hydrogenation.

When reduction was complete, as shown by no further absorption of hydrogen, the mass was cooled to room temperature and filtered from the catalyst. The filtrate was freed of solvent by distillation and the residue was distilled under reduced pressure. The product was 184 parts, 56% theory, of N-(n-butyl)-p-aminophenol as a yellow oil, B. P. 150–161° C. at 0.5 mm. pressure, which promptly solidified on standing and contained 8.47% N. The theory for N-(n-butyl)-p-aminophenol ($C_{10}H_{15}ON$) is 8.48% N.

When the aldehyde was added to the reaction mixture prior to hydrogenation, a much smaller yield of an inferior product was obtained. An autoclave was charged with 164 parts of p-aminophenol, 20 parts of an active nickel-on-kieselguhr catalyst and 500 parts by volume of toluene. The air was displaced by hydrogen, and the autoclave was sealed. The mass was heated to 125° C. with stirring and 144 parts of freshly distilled n-butyraldehyde was passed into the autoclave during the course of two hours. When addition of the aldehyde was complete, a pressure of 300 lbs./sq. in. of hydrogen was applied. Absorption of hydrogen took place and additional quantities of the gas were added to maintain the pressure at between 200 and 300 lbs./sq. in. The temperature was maintained at 120–130° C. and the mass was agitated during the entire hydrogenation. When reduction was complete, as shown by no further absorption of hydrogen, the mass was cooled to room temperature and filtered from catalyst and a large amount of p-aminophenol. The filtrate was freed of solvent by distillation and the residue was distilled under reduced pressure. The product was 24 parts, 10% theory, of a yellow oil, B. P. 145–160° C. at 0.5 mm. pressure, which did not solidify on standing and contained 7.88% N.

EXAMPLE 10.—*N-isobutyl-p-aminophenol*

An autoclave was charged with 436 parts of p-aminophenol, 40 parts of an active nickel-on-kieselguhr catalyst and 1,000 parts by volume of toluene. The air was displaced by hydrogen, the mass heated to 120° C. and a pressure of 300 lbs. per sq. in. of hydrogen applied. While the charge was agitated, 575 parts of isobutyraldehyde, dissolved in 720 parts by volume of toluene, was pumped into the autoclave in 13 approximately equal portions during the course of 44 hours. After each portion was added, absorption of hydrogen took place and the next portion was not added until hydrogen absorption had almost stopped. Additional quantities of hydrogen were added to maintain the pressure at between 250 and 300 lbs./sq. in., and the temperature was held at 120–130° C. during the entire hydrogenation.

When all the aldehyde solution had been added and when reduction was complete, as shown by no further absorption of hydrogen, the mass was cooled to room temperature and filtered from the catalyst. The filtrate was free of solvent by distillation and the residue was distilled under reduced pressure. The product was 511 parts, 77% theory, of a yellow oil, B. P. 160–185° C. at 0.5 mm. pressure, which partially solidified on standing and contained 7.88% N. The theory for N-isobutyl-p-aminophenol ($C_{10}H_{15}ON$) is 8.48% N.

When the aldehyde was added to the reaction mixture prior to hydrogenation, a much smaller yield of an inferior product was obtained. An autoclave was charged with 109 parts of p-aminophenol, 72 parts of isobutyraldehyde, 20 parts of an active nickel-on-kieselguhr catalyst and 200 parts by volume of toluene. The air was displaced by hydrogen, the mass was heated to 125° C. with agitation and a pressure of 500 lbs./sq. in. of hydrogen was applied. Hydrogen was absorbed, and additional quantities of the gas were added in order to maintain approximately the above pressure. When reduction was complete, as shown by no further absorption of hydrogen, the mass was cooled to room temperature and filtered from catalyst and a considerable amount of p-aminophenol. The filtrate was freed of solvent by distillation and the residue was distilled under reduced pressure. The product was 47 g., 28% theory, of a yellow oil, B. P. 140–170° C./0.5 mm., containing 7.1% N.

When methanol was used as the solvent, a high yield of a very pure product was obtained. An autoclave was charged with 436 parts of p-aminophenol, 346 parts of isobutyraldehyde, 44 parts of an active nickel-on-kieselguhr catalyst and 730 parts of methanol. Air was displaced by hydrogen and the charge was slowly heated with stirring under 400–500 lbs./sq. in. hydrogen pressure to 100° C. Reduction started at about 75° C. and proceeded rapidly at 85 to 100° C. The charge was held at 85 to 100° C. and 400 to 500 lbs./sq. in. hydrogen pressure with stirring until no more hydrogen was absorbed. The reduced charge was cooled to room temperature and filtered from catalyst. The filtrate was freed of solvents by distillation, and the residue was distilled under 1 to 2 mm. pressure. The product was 594 parts, 90% theory, of N-isobutyl-p-aminophenol as a yellow oil which promptly solidified and contained 8.17% N.

Example 11.—N-(2-methyl pentyl)-p-aminophenol

A pressure bottle was charged with 44 parts of p-aminophenol, 45 parts of 2-methyl pentanal, 0.3 part of a platinum oxide catalyst, prepared according to the method of Adams, Vorhees and Shriner, Organic Syntheses, vol. XIII, page 92, and 100 parts by volume of methanol. Air was replaced by hydrogen and the charge was shaken under 45.5 lbs./sq. in. hydrogen pressure at room temperature. The pressure rapidly dropped to 17 lbs./sq. in., then remained constant. When reduction was complete, as shown by no further drop in hydrogen pressure, the charge was filtered from catalyst. The filtrate was freed of solvent by distillation and the residue was distilled under 0.5 mm. pressure. The product was 68 parts, 95% theory, of yellow oil containing 7.53% N. The theory for N-(2-methyl pentyl)-p-aminophenol ($C_{12}H_{19}ON$) is 7.25% N.

The product, although fairly pure as shown by analysis, was further purified through its neutral oxalate salt. This salt was prepared by the addition of one equivalent of oxalic acid to an alcoholic solution of the product and was purified by crystallization from 50% alcohol. The purified oxalate was obtained as white needles, melting at 188° C. with evolution of gas. The nitrogen content was found to be 5.76% N whereas the theory for N-(2-methyl pentyl)-p-aminophenol neutral oxalate ($C_{26}H_{40}O_6N_2$) is 5.88% N. The purified base was obtained by treating an aqueous suspension of the salt with excess ammonium hydroxide and extracting with ether. The extract was dried over sodium sulfate and freed of ether by distillation. The residue was distilled under reduced pressure. N-(2-methyl pentyl)-p-aminophenol was thus obtained as a colorless oil, B. P. 145–149° C. at 0.5 mm. pressure, containing 7.16% N.

Example 12.—N-(2,4-dimethyl pentyl)-p-aminophenol

A pressure bottle was charged with 44 parts of p-aminophenol, 57 parts of 2,4-dimethyl pentanal, 0.25 part of a platinum oxide catalyst, prepared as in Example 11, and 100 parts by volume of methanol. Air was replaced by hydrogen and the charge was shaken at room temperature under 48.5 lbs. per sq. in. hydrogen pressure. The pressure rapidly dropped to 9 lbs. per sq. in., then remained constant. When reduction was complete, as shown by no further drop in the hydrogen pressure, the charge was filtered from catalyst. The filtrate was freed of solvent by distillation and the residue was distilled under 0.5 mm. pressure. The product was 86 g., 103% theory, of a colorless oil containing 6.25% N. The theory for N-(2,4-dimethyl pentyl)-p-aminophenol ($C_{13}H_{21}ON$) is 6.76% N.

The product, although fairly pure as shown by analysis, was further purified through its neutral oxalate salt as described in Example 11. The purified salt melted at 187–188° C. with gas evolution and contained 5.54% N. The theory for N-(2,4-dimethyl pentyl)-p-aminophenol neutral oxalate ($C_{28}H_{44}O_6N_2$) is 5.55% N. The purified N-(2,4-dimethyl pentyl)-p-aminophenol was obtained as a colorless oil, B. P. 150–156° C. at 0.5 mm., containing 6.68% N.

While, in the above examples, I have disclosed the products made from p-aminophenol, it will be understood that other aminophenols, such as ortho-aminophenol, the aminocresols, the aminonaphthols and the like, may be employed in place of the p-aminophenol to obtain the corresponding N-alkyl- and N-alkylidene aminophenols, aminocresols, aminonaphthols and the like.

Any of the well known hydrogenation catalysts can be employed in the hydrogenation step. The quantity of the catalyst employed may be widely varied. In general, the amount of catalyst required will decrease with increase in the activity of the catalyst and increase in the pressures employed. In any case, however, the amount of catalyst necessary to complete the reduction may be diminished by adding the catalyst gradually or step-wise to the reaction mixture during the course of the reduction. In this modification of the process, the catalyst may be added dry or suspended or dispersed in a liquid. The catalyst, whether or not it is added prior to, or during the reduction process, may be supported on a suitable support such as, for example, kieselguhr, carborundum, or the like. The catalyst may be distributed throughout the reaction mixture or fixed on a carrier in such a way that its position is more or less permanent.

In place of the platinum oxide catalyst, employed in some of the examples, any other noble metal catalyst, such as palladium oxide, may be used. An active nickel catalyst, particularly active nickel supported on kieselguhr, is preferably employed. However, other catalysts, especially of the iron group, such as active iron or cobalt, may be used. If desired, the catalyst may be in the form of a metallic wool or screen. The catalyst may also comprise a salt of a hydrogenating metal, such as, for example, cobalt, copper, iron, silver or nickel, employed together with a promoting oxide. A catalyst of this latter type is copper chromite which may be used in place of nickel, either with or without previous reduction.

The temperatures and pressures of operation, particularly in the hydrogenation step, are subject to considerable variation, depending on the nature of the alkylidene aminophenol, the solvent employed and the catalyst. When employing a noble metal catalyst, the hydrogenation may be readily accomplished at room temperatures and under pressures of about 2 to about 3 atmospheres. When a base metal catalyst is employed, temperatures of from about 75° C. to about 150° C. and pressures of from about 10 to 100 atmospheres will generally be preferred. With either type of catalyst, temperatures as high as 200° C. and pressures as high as 2,000 lbs. per sq. in. or higher may be used. The particular temperatures and pressures employed will depend to a great extent upon the desire of the operator and the equipment available. The temperatures and pressures of operation should preferably be so regulated that the solvent employed is not materially hydrogenated.

The method of mixing the aldehyde and the aminophenol is of considerable importance in certain cases. If these reagents are mixed prior to the hydrogenation, then the aldehyde may be added to the aminophenol or the aminophenol may be added to the aldehyde in the desired solvent. However, it will generally be preferred to add the aldehyde to the aminophenol so as to avoid objectionable polymerization of the aldehyde. Preferably, the aldehyde and the aminophenol are mixed during the course of the hydrogenation, and best results are then obtained by adding the aldehyde to the aminophenol. In order to obtain high yields with readily polymerizable aldehydes, such as the normal saturated aldehydes, it appears to be essential to add the aldehyde slowly to the aminophenol during the hydrogenation. The aldehyde may be added as such, dissolved in a solvent, or dispersed in a suitable liquid medium.

In order to show more clearly the advantages of adding the aldehyde to the aminophenol during the hydrogenation, N-(n-butyl)-p-aminophenol and N-(isobutyl)-p-aminophenol were prepared by hydrogenation of a reaction mixture of the corresponding aldehyde and p-aminophenol in toluene, using a nickel catalyst. The results, obtained by hydrogenating during the addition of the aldehyde as compared with hydrogenating after the addition of the aldehyde, are shown in the following Table I. The purity of the product obtained is shown by the nitrogen analysis.

Table I

| Aldehyde | Reaction mixture prepared | Yield as percent theory based on p-aminophenol | Nitrogen content | Theoretical nitrogen content |
|---|---|---|---|---|
| | | Percent | Percent | Percent |
| n-Butyraldehyde | Just prior to hydrogenation. | 10 | 7.88 | 8.48 |
| Do | During hydrogenation. | 56 | 8.47 | 8.48 |
| Isobutyraldehyde | Just prior to hydrogenation. | 28 | 7.1 | 8.48 |
| Do | During hydrogenation. | 77 | 7.88 | 8.48 |

From this table, it will be apparent that a very great improvement was obtained in the quality and quantity of the product produced and such results were unexpected.

It may be further pointed out that, when the aldehyde is added prior to reduction, the use of relatively pure starting materials is essential to the success of the reaction. On the other hand, when the aldehyde is added during the hydrogenation, relatively impure starting materials may be used without affecting the success of the reaction. In this way, expensive purification of starting materials, such as distillation of the aldehyde to remove acids, is eliminated.

Further, when the alpha-isoalkylidene-aminophenols are prepared from suspensions or solutions of the aminophenols in water, prior to hydrogenation, the product is usually contaminated with appreciable amounts of unreacted aminophenol. The aminophenol can be removed only with difficulty from the Schiff's base or from the N-a-isoalkyl aminophenol obtained by hydrogenation of the Schiff's base. If not removed, the aminophenol imparts an undesirable color to the N-a-isoalkyl aminophenol and renders it difficult to distill, due in part to sublimation of the aminophenol and in part to decomposition of the aminophenol under the conditions employed for distillation. In view of the teaching of prior art that Schiff's bases of aminophenols tend to hydrolyze at the —N=CH— linkage, it would be supposed that contamination of Schiff's bases prepared in water by aminophenols is the result of hydrolysis and that such contamination could be inhibited or prevented by using an excess of aldehyde in the preparation of the Schiff's base. I have found that this is not the case and that the use of excess aldehyde does not prevent such contamination. The presence of aminophenol in the Schiff's base appears to be due largely or entirely to occlusion. I have further found that the presence of aminophenol in the reduced product can be eliminated by adding a substantially equimolecular portion, based on the aminophenol present, of aldehyde to the contaminated Schiff's base prior to or during hydrogenation. The following experiment illustrates the advantages of such addition.

One hundred and seventy-two parts of isobutyraldehyde was rapidly added with stirring to 218 parts of p-aminophenol suspended in 1600 parts by volume of water containing 8 parts of glacial acetic acid at 55–60° C. After stirring for about 5 minutes, the mixture was cooled to 10° C. and filtered. The precipitate, after being dried in a slow stream of air at room temperature, was 286 parts of light-tan solid, m. p. 135–140° C. Two charges of this crude N-isobutyral-p-aminophenol were hydrogenated.

*Charge I.*—125 parts of the crude N-isobutyral-p-aminophenol described above and 10 parts of an active nickel-on-kieselguhr catalyst in 200 parts by volume of methanol were shaken under 400–500 lbs. per sq. in. hydrogen pressure at about 100° C. until no more hydrogen was absorbed. The charge was then cooled and filtered from the catalyst and 16 parts of p-aminophenol. The filtrate was freed of solvent by distillation on a steam bath under about 200 mm. pressure. The residue was slurried with 100 parts by volume of warm benzene, cooled and filtered from 13 parts more p-aminophenol. After removal of solvent from the filtrate, the residue was distilled in vacuo. About 20 parts of tarry material did not distill up to 200° C. at 0.5 mm. pressure. The distilled product was 71 parts of a yellow oil, B. P. 120–150° C. at 0.5 mm. pressure, which contained some sublimed p-amino-phenol, slowly congealed to a waxy solid on cooling and contained 8.64% N. The theory for N-isobutyl-p- aminophenol ($C_{10}H_{15}ON$) is 8.48% N. This yield is 73% of the theory, allowing for the p-aminophenol recovered.

*Charge II.*—125 parts of the crude N-isobutyral-p-aminophenol described above was hydrogenated and the product isolated as described for Charge I, except that 17 parts of iso-butyraldehyde was added prior to hydrogenation. No p-aminophenol was obtained with the catalyst or when the crude product was slurried with benzene. Only about 10 parts of tarry material did not distill up to 200° C. at 0.5 mm. pressure. The distilled product was 124 parts of a light yellow oil, B. P. 125-145° C. at 0.5 mm. pressure, which contained no sublimed p-aminophenol, rapidly crystallized on cooling and contained 8.65% N. This yield is 89% of the theory, assuming that sufficient p-aminophenol was present to react with all the aldehyde added.

It will be seen from the above experiment that the addition, prior to hydrogenation, of iso-butyraldehyde to N-isobutyral-p-aminophenol containing p-aminophenol not only gave a product free from p-aminophenol but also caused the formation of less tarry material, improved the yield of N-isobutyl-p-aminophenol and gave a product with a better appearance. It will further be seen that the overall yield, allowing for p-aminophenol recovered in Charge I and for increase in weight due to the aldehyde added in Charge II, was increased from 73% to 89% by the addition of the aldehyde. These results were not to be expected. At least equally good results are obtained when the aldehyde is added during the hydrogenation.

When Schiff's bases are prepared in solvents such as toluene, alcohol or dilute alcohol, the product generally contains no appreciable quantity of unreacted aminophenol. However, the primary aminophenols are usually prepared in water. Hence, it is usually most convenient and economical to prepare Schiff's bases from the aqueous reaction mixture produced in preparing the aminophenol rather than to isolate the aminophenol and to subsequently prepare the Schiff's base. By the above method, I have made it possible to prepare N-alkyl aminophenols in substantially pure form with very materially increased yields from Schiff's bases prepared in water.

In order to illustrate more clearly the advantages of the use of polar solvents and aliphatic hydrocarbon solvents over the prior proposed use of non-polar solvents, such as aromatic hydrocarbons, particularly in reducing N-alkylidene aminophenols to the corresponding N-alkyl aminophenols, experiments were performed as follows: In each case, 55 parts of p-aminophenol, 72 parts of isobutyraldehyde, 15 parts of an active nickel-on-kieselguhr catalyst and about 200 parts of a solvent were shaken under 300 to 400 lbs./sq. in. of hydrogen pressure. The temperature employed was varied between 80° C. and 150° C., depending on the nature of the solvents. When reduction was complete, as shown by no further absorption of hydrogen, the charge was cooled and filtered from the catalyst. When cetane and water were used as solvents, the product was partially insoluble and was dissolved in methanol before filtering from the catalyst. The filtrate was then freed of solvent by distillation and the residue was distilled under reduced pressure. In the following table, the yield of distilled N-(isobutyl)-p-aminophenol is given for each solvent and the purity of the product is indicated by its nitrogen analysis. The solvents used were recovered substantially unchanged, except for the presence of water formed in the reaction and perhaps some unchanged aldehyde.

*Table II*

| Solvent | Yield as percent of theory based on p-aminophenol | Nitrogen content | Theoretical nitrogen content |
| --- | --- | --- | --- |
| | *Percent* | *Percent* | *Percent* |
| Toluene | 28 | 7.1 | 8.48 |
| Methanol | 90 | 8.17 | 8.48 |
| Acetone | 86 | 8.54 | 8.48 |
| Ethyl acetate | 92 | 8.62 | 8.48 |
| Isopropyl ether | 88 | 8.58 | 8.48 |
| Dioxane | 90 | 8.48 | 8.48 |
| Methyl cellosolve | 92 | 8.45 | 8.48 |
| Cetane | 36 | 7.74 | 8.48 |
| Ethylene dichloride | 53 | 7.48 | 8.48 |
| Water | 63 | 7.88 | 8.48 |

From the above tests, it will be apparent that, when the polar solvents or aliphatic hydrocarbons are employed in place of the non-polar solvents, such as toluene, a marked improvement in the quantity and quality of the product was obtained. This was unexpected since it is contrary to the teaching of the prior art. For example, in Patent No. 2,063,151, it is pointed out that, when N-benzal-p-aminophenol was reduced to N-benzyl-p-aminophenol in toluene or benzene, yields of about 95% of the desired product were obtained, whereas, when ethyl alcohol was employed as the solvent, yields of only about 50% were obtained.

It is known that, when N-aralkylidene aminophenols are reduced by catalytic hydrogenation in the presence of water, there is more or less splitting of the molecule at the —N=CH— linkage. Thus, N-benzal p-aminophenol, under such conditions, splits up to give p-aminophenol and toluene. It is further known that N-aralkylidene-p-aminophenols hydrolyze in the presence of water to give aminophenols and aldehydes. Thus, N-benzal-p-aminophenol hydrolyzes to p-aminophenol and benzaldehyde. Accordingly, in the methods previously proposed for hydrogenating Schiff's bases of aminophenols, it has been considered necessary to operate under essentially anhydrous conditions, removing water as it was formed. This entailed the expense and labor of isolating and drying the Schiff's base prior to its reduction.

It has also been proposed to reduce Schiff's bases by chemical means in aqueous media, rather than by catalytic hydrogenation. Thus, it has been proposed to reduce Schiff's bases with zinc dust and caustic soda in aqueous solutions and dispersions. However, when employing such chemical means, it has been found necessary to employ temperatures corresponding to room temperatures or lower, preferably very much below room temperatures, in order to prevent splitting and hydrolysis at the —N=CH— linkage. Such low temperatures are not always convenient or satisfactory in the case of catalytic hydrogenations, and it is usually preferred to use higher temperatures.

I have found that the N-alkylidene aminophenols react differently than the N-aralkylidene aminophenols and similar Schiff's bases, discussed in the two preceding paragraphs. I have found that the N-alkylidene aminophenols can be hydrogenated by catalytic hydrogenation at superatmospheric temperatures as high as 200° C.

in the presence of substantial quantities of water without appreciable splitting or hydrolysis at the —N=CH— linkage. This is true of the N-(alpha-isoalkylidene)-aminophenols of Clarkson, which are disclosed to be somewhat unstable in the presence of water, and the even more unstable N-(alkylidene)-aminophenols. By this discovery, I have been able to effect marked economies in the process through elimination of the heretofore employed costly steps of isolating and drying the Schiff's bases. Further economies are effected by eliminating the necessity for the costly removal of water from the solvent, thus making it possible to reuse the hydrogenation solvents without removal of their water content.

The N-alkyl aminophenols and the new N-(alpha-beta-alkenylidene)-aminophenols of my invention have many uses, among which may be mentioned their use in gasoline, rubber, fats, oils, waxes, and motor fuels, such as cracked gasoline, containing anti-knock agents, such as tetraethyl lead, and similar substances to retard or inhibit gum formation and oxidation and to improve their stability. They may also be employed as intermediates in the production of dyestuffs and pharmaceutical chemicals.

While I have disclosed the preferred embodiments of my invention and the preferred modes of carrying the same into effect, it will be readily apparent to those skilled in the art that many variations and modifications may be made therein without departing from the spirit of my invention. Accordingly, the scope of my invention is to be limited solely by the appended claims construed as broadly as is permissible in view of the prior art.

I claim:

1. In the preparation of N-alkyl-aminophenols, the steps which comprise condensing 1 mole of an unsubstituted aliphatic aldehyde with 1 mole of a primary aminophenol and hydrogenating the condensation product so formed as fast as it is formed.

2. In the preparation of N-alkyl-aminophenols, the step which comprises condensing 1 mole of an unsubstituted aliphatic aldehyde with 1 mole of a primary aminophenol in the liquid phase under hydrogenating conditions in the presence of a hydrogenating catalyst.

3. In the preparation of N-alkyl-aminophenols, the steps which comprise preparing a mixture of a primary aminophenol and a hydrogenating catalyst in a solvent, subjecting the mixture to hydrogenating conditions, then gradually adding a substantially equimolecular proportion of an unsubstituted aliphatic aldehyde to the mixture, and maintaining the hydrogenating conditions during the addition of the aldehyde and until hydrogenation is complete.

4. In the preparation of N-alkyl-aminophenols, the steps which comprise preparing a mixture of a primary aminophenol and a hydrogenating catalyst in a solvent of the group consisting of polar solvents and aliphatic hydrocarbon solvents, subjecting the mixture to hydrogenating conditions, then gradually adding a substantially equimolecular proportion of an unsubstituted aliphatic aldehyde to the mixture, and maintaining the hydrogenating conditions during the addition of the aldehyde and until hydrogenation is complete.

5. In the preparation of N-alkyl-aminophenols, the steps which comprise preparing a mixture of a primary aminophenol and a hydrogenating catalyst in a polar solvent, subjecting the mixture to hydrogenating conditions, then gradually adding a substantially equimolecular proportion of an alkyl aldehyde to the mixture, and maintaining the hydrogenating conditions during the addition of the aldehyde and until hydrogenation is complete.

6. In the preparation of N-alkyl-aminophenols, the steps which comprise preparing a mixture of a primary aminophenol and a hydrogenating catalyst in a mixture of a polar solvent, other than water, with a substantial amount of water, subjecting the mixture to hydrogenating conditions, then gradually adding a substantially equimolecular proportion of an alkyl aldehyde to the mixture, and maintaining the hydrogenating conditions during the addition of the aldehyde and until hydrogenation is complete.

7. In the preparation of N-alkyl-aminophenols, the steps which comprise condensing 1 mole of alpha-beta-alkenyl aldehyde with 1 mole of a primary aminophenol and hydrogenating the N-(alpha-beta-alkenylidene)-aminophenol so formed as fast as it is formed.

8. In the preparation of N-alkyl-aminophenols, the steps which comprise preparing a mixture of a primary aminophenol and a hydrogenating catalyst in a solvent, subjecting the mixture to hydrogenating conditions, then gradually adding a substantially equimolecular proportion of an alpha-beta-alkenyl aldehyde to the mixture, and maintaining the hydrogenating conditions during the addition of the aldehyde and until hydrogenation is complete.

9. In the preparation of N-alkyl-aminophenols, the steps which comprise preparing a mixture of a primary aminophenol and a hydrogenating catalyst in a polar solvent, subjecting the mixture to hydrogenating conditions, then gradually adding a substantially equimolecular proportion of an alpha-beta-alkenyl aldehyde to the mixture, and maintaining the hydrogenating conditions during the addition of the aldehyde and until hydrogenation is complete.

10. In the preparation of N-alkyl-aminophenols, the step which comprises hydrogenating a member of the group consisting of N-primary-alkylidene-aminophenols and N-primary-alkenylidene-aminophenols, in which the alkylidene and alkenylidene groups contain at least three carbon atoms, in a polar solvent in the presence of a hydrogenating catalyst.

11. In the preparation of N-alkyl-aminophenols, the step which comprises hydrogenating a member of the group consisting of N-primary-alkylidene-aminophenols and N-primary-alkenylidene-aminophenols, in which the alkylidene and alkenylidene groups contain at least three carbon atoms, in a mixture of a polar solvent, other than water, with a substantial amount of water in the presence of a hydrogenating catalyst.

12. In the preparation of N-alkyl-aminophenols, the step which comprises hydrogenating a member of the group consisting of N-primary-alkylidene-aminophenols and N-primary-alkenylidene-aminophenols containing in admixture therewith a primary aminophenol in a solvent in the presence of a hydrogenating catalyst and in the presence of a substantially equimolecular proportion of an unsubstituted aliphatic aldehyde, based on the primary aminophenol.

13. In the preparation of N-alkyl-aminophenols, the steps which comprise hydrogenating an N-primary-alkylidene-aminophenol containing in admixture therewith a primary aminophenol in a solvent in the presence of a hydrogenating catalyst and adding to the reacting mixture, during the hydrogenation, a substantially equimolecular proportion of an alkyl aldehyde, based on the primary aminophenol.

14. In the preparation of N-alkyl-aminophenols, the step which comprises hydrogenating a member of the group consisting of N-primary-isoalkylidene-aminophenols and N-primary-isoalkenylidene-aminophenols containing in admixture therewith a primary aminophenol in a solvent in the presence of a hydrogenating catalyst and in the presence of a substantially equimolecular proportion of an unsubstituted isoaliphatic aldehyde, based on the primary aminophenol.

15. In the preparation of N-alkyl-aminophenols, the step which comprises condensing 1 mol of an alpha-beta-alkenyl aldehyde with 1 mol of a primary aminophenol in an inert solvent at temperatures of from about 33° C. to about 47° C.

16. In the preparation of N-alkyl-aminophenols, the step which comprises condensing 1 mol of an alpha-beta-alkenyl aldehyde with 1 mol of a primary aminophenol in an aqueous solvent at temperatures of from about 33° C. to about 47° C.

17. In the preparation of N-butyl-p-aminophenol, the steps which comprise condensing 1 mol of butyraldehyde with 1 mol of p-aminophenol and hydrogenating the condensation product so formed as fast as it is formed.

18. In the preparation of N-butyl-p-aminophenol, the steps which comprise preparing a mixture of p-aminophenol and a hydrogenating catalyst in a mixture of a polar solvent, other than water, with a substantial amount of water, subjecting the mixture to hydrogenating conditions, then gradually adding a substantially equimolecular proportion of butyraldehyde to the mixture, and maintaining the hydrogenating conditions during the addition of the butyraldehyde and until hydrogenation is complete.

19. In the preparation of N-isobutyl-p-aminophenol, the steps which comprise condensing 1 mol of isobutyraldehyde with 1 mol of p-aminophenol and hydrogenating the condensation product so formed as fast as it is formed.

20. In the preparation of N-isobutyl-p-aminophenol, the steps which comprise preparing a mixture of p-aminophenol and a hydrogenating catalyst in a mixture of a polar solvent, other than water, with a substantial amount of water, subjecting the mixture to hydrogenating conditions, then gradually adding a substantially equimolecular proportion of isobutyraldehyde to the mixture, and maintaining the hydrogenating conditions during the addition of the isobutyraldehyde and until hydrogenation is complete.

21. In the preparation of N-isobutyl-p-aminophenol, the step which comprises hydrogenating N-isobutylidene-p-aminophenol, in a polar solvent in the presence of a hydrogenating catalyst.

22. In the preparation of N-butyl-p-aminophenol, the steps which comprise preparing a mixture of p-aminophenol and a hydrogenating catalyst in a polar solvent, subjecting the mixture to hydrogenating conditions, then gradually adding a substantially equimolecular proportion of crotonaldehyde to the mixture, and maintaining the hydrogenating conditions during the addition of the crotonaldehyde and until hydrogenation is complete.

HOWARD M. FITCH.